United States Patent
Murphy

(10) Patent No.: US 6,225,890 B1
(45) Date of Patent: May 1, 2001

(54) VEHICLE USE CONTROL

(75) Inventor: Michael D. Murphy, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/045,729

(22) Filed: Mar. 20, 1998

(51) Int. Cl.⁷ ................................................ B60R 25/10

(52) U.S. Cl. .................. 340/426; 340/539; 340/825.31; 340/825.32; 340/989; 340/991; 307/10.5

(58) Field of Search ................................ 340/425.5, 426, 340/539, 988, 989, 991, 825.31, 825.32; 307/10.5; 180/287

(56) References Cited

U.S. PATENT DOCUMENTS

| | | | |
|---|---|---|---|
| 4,817,432 | 4/1989 | Wallace et al. | 73/602 |
| 5,193,064 | 3/1993 | Maki | 364/454 |
| 5,222,152 | 6/1993 | Fishbine et al. | 382/2 |
| 5,229,764 | 7/1993 | Matchett | 340/825.34 |
| 5,230,025 | 7/1993 | Fishbine et al. | 382/4 |
| 5,259,025 | 11/1993 | Monroe et al. | 380/23 |
| 5,268,963 | 12/1993 | Monroe et al. | 380/23 |
| 5,280,527 | 1/1994 | Gullman et al. | 380/23 |
| 5,291,560 | 3/1994 | Daugman | 382/2 |
| 5,335,288 | 8/1994 | Faulkner | 382/4 |
| 5,469,506 | 11/1995 | Berson et al. | 380/23 |
| 5,483,601 | 1/1996 | Faulkner | 382/115 |

(List continued on next page.)

OTHER PUBLICATIONS

Trimble Navigation Spec. Sheet(s) for Placer GPS 450/455 Unit.
Trimble Navigation Spec. Sheet(s) for Cross Check AMPS Cellular Unit.
"Seeing with Sonar", WIRED Magazine, Feb. 1998, P–7.
Ten Pages of Biometric Indicium device Advertisements from the Internet, Feb. 24, 1998 (Visionics Face It PC 3.0; Recognition Systems Personal I.D.; American Biometric Co. Bio Mouse Desktop Fingerprint Scanner; Veri Voice; Touch and go Electronic Vehicle Security Systems).
"EU Veincheck Project takes Off", Biometric Technology Today, vol. 4, No. 5, Sep. 1996, pp. 1–2.
"The Body as Password", WIRED magazine, Jul. 1997, pp. 132–135, 174–175.

*Primary Examiner*—Daryl Pope
(74) *Attorney, Agent, or Firm*—John Schipper

(57) ABSTRACT

A system for restricting use of a vehicle by a selected vehicle operator to permitted time intervals and permitted vehicle travel corridors. If a driver is seated behind the driver's wheel, the system requires that the driver provide one or more samples of an ident indicium, such as a fingerprint, facial scan, retinal scan, voice sample or blood sample analysis, to identify the driver, or of a personal identification indicium contained on a token or card, or of personal information entered using a data entry device (e.g., keypad). When this indicium is satisfactorily presented and analyzed, the system allows operation of the vehicle (including selected vehicle accessories) but further determines (i) whether the present time and/or accumulated vehicle operation time and/or mileage is within a permitted time interval or accumulated time and/or mileage range and (ii) whether the vehicle present location and/or speed are within permitted ranges corresponding to the permitted time interval. If either condition (i) or (ii) is not met, vehicle operation is temporarily disabled, or a coded alarm signal is transmitted, or other appropriate control actions are taken. Alternatively, operation of a vehicle is restricted to one or more permitted location and/or velocity ranges and to one or more permitted time intervals or accumulated operation time and/or mileage ranges. Vehicle location determination (LD) can be implemented using signals from GPS, GLONASS, LEO, LORAN or similar LD systems. A permitted travel region and/or a permitted time interval can be changed remotely, by transmission of a change or reprogramming signal, or can be changed at the LD system carried on the vehicle.

39 Claims, 9 Drawing Sheets

U.S. PATENT DOCUMENTS

| | | | |
|---|---|---|---|
| 5,485,161 | 1/1996 | Vaughn | 342/357 |
| 5,534,855 | 7/1996 | Shockley et al. | 340/825.3 |
| 5,539,810 | 7/1996 | Kennedy, III et al. | 379/59 |
| 5,544,225 | 8/1996 | Kennedy, III et al. | 379/59 |
| 5,563,453 | 10/1996 | Nyfelt | 307/10.2 |
| 5,579,909 | 12/1996 | Deal | 206/317 |
| 5,586,171 | 12/1996 | McAllister et al. | 379/67 |
| 5,594,806 | 1/1997 | Colbert | 382/115 |
| 5,613,012 | 3/1997 | Hoffman et al. | 382/115 |
| 5,615,277 | 3/1997 | Hoffman | 382/115 |
| 5,638,832 | 6/1997 | Singer et al. | 128/899 |
| 5,648,763 | 7/1997 | Long | 340/825.49 |
| 5,686,765 | 11/1997 | Washington | 307/10.5 |
| 5,699,275 | 12/1997 | Beasley et al. | 364/514 R |

VEHICLE USE CONTROL

FIELD OF THE INVENTION

This invention relates to imposition or restrictions on or control of use, or inappropriate use, of a vehicle by a vehicle operator, in a manner that minimizes the possibility of evasion by a (restricted) operator.

BACKGROUND OF THE INVENTION

Certain vehicle operators ("restricted operators" or "ROs") have their vehicle use privileges restricted from time to time. These vehicle use restrictions may arise because of one or more recent convictions of the operator for driving under the influence of alcohol or drugs, because of recent physical, mental or emotional impairment or the advanced age of the operator, or because of other similar reasons. Other restrictions may be applied to any driver of a vehicle that transports hazardous materials or that school children or groups of persons with special health or safety problems. Under appropriate circumstances, a court or other regulatory agency will often allow the restricted operator to use his/her vehicle only for transportation between the driver's residence and the driver's place of work, physician/pharmacy office or similar destination, and only in restricted time intervals. One problem here is how to monitor the restricted operator's use of the vehicle to confirm that the vehicle is being used only within a permitted corridor and/or only within a permitted time interval, when used by that person.

In other applications, access to a vehicle may be restricted to a limited set of vehicle operators. Use of a personalized and unspoofable method of providing access, which goes beyond mere possession of an ignition key, may be desirable. For example, limiting access to a specified vehicle in a fleet of vehicles may be desired, such as access to a particular rental vehicle by an identified person who has rented that vehicle.

Several workers have disclosed methods for tracking the location of a person as that person moves around within a confinement region. One solution of the site confinee tracking problem contemplated by some of these previous workers is to bind a GPS antenna/receiver and a cellular or other signal transmitter to the site confinee's body (1) to confine the site confinee to the confinement site during normal times by GPS-assisted location monitoring, and (2) to reprogram the boundary of the confinement site (stored in memory) to include the designated site and a narrow corridor or path between the confinement site and the designated site, within a selected time interval, to allow the site confinee to move to the designated site and back to the confinement site, again using GPS signals to monitor the confinee's present location.

This approach, although straightforward, does not by itself provide tracking of vehicle location (only) during the times the restricted operator uses the vehicle and does not prevent the restricted operator from spoofing the system to cause the system to conclude that the vehicle is within a permitted corridor, when in fact the vehicle is elsewhere. Further, it may be desired to restrict use of a vehicle to a selected region, whether or not the vehicle is operated by an RO.

Receipt and analysis of a biometric sample supplied by a person to verify the asserted identity of that person is disclosed in several U.S. Patents. These patents usually contemplate determination of that person's identity once and at a fixed place of receipt of the sample.

What is needed is an integrated location determination system and control system with anti-spoofing capability, for automatically distinguishing between a restricted operator, seated behind the driver's wheel of a vehicle, and some other driver, for determining the present vehicle location, and for comparing the present vehicle location with a permitted vehicle travel corridor and with a permitted time interval for vehicle travel. Preferably, the permitted time interval(s) and permitted vehicle corridor(s) should be flexible and should be capable of being changed by an authorized monitoring agency or person. Preferably, the monitoring system should include anti-spoofing mechanisms that make it difficult, if not impossible, for the restricted operator to operate a designated vehicle, or any vehicle, without activating a vehicle location reporting unit that is carried by the vehicle. In another mode of operation, the system should preferably allow operation of the vehicle to be restricted to a selected region, irrespective of who operates the vehicle.

SUMMARY OF THE INVENTION

These needs are met by the invention, which provides a system, method and associated apparatus that monitors and discretionarily reports the location of a designated vehicle, whenever the restricted operator ("RO") is seated behind the driver's wheel of and operates this vehicle. In one embodiment, each person who is seated behind the driver's wheel must present a sample of a biometric indicium (thumbprint, fingerprint, handprint, facial scan, retinal scan, blood sample scan, etc.), which is compared with corresponding biometric indicia stored in a database. In some embodiments, the vehicle operator is required to present another sample of the biometric indicium at unpredictable times while the vehicle is operated. Alternatively, a token with encoded information concerning the driver must be presented.

From a comparison of the stored driver identification indicia and the biometric sample or token presented by the vehicle operator, the control system assigns the driver to one of five categories: (1) a restricted operator (RO); (2) an identified and authorized operator who is not an RO; (3) an unidentified operator; (4) an operator whose identification indicium (presented) is too degraded to permit determination of the operator's identity; and (5) an operator who has failed to present a sample of the requested identification indicium. Different driving restrictions are imposed, depending upon the category to which the operator belongs.

If the operator is determined to be an RO, the location determination (LD) system determines the present time and present vehicle location and/or speed and compares these with the permitted time intervals and permitted travel corridor(s) and speeds for travel. If a mismatch is found, one or more of 12 Control Actions can be taken, or some other restriction can be imposed that is consistent with the vehicle use restrictions imposed on the RO.

Where the person driving the vehicle is an unrestricted operator but operation of the vehicle is restricted to a selected time interval or geographic region, or the vehicle speed or another attribute is restricted, an LD system attached to or carried on or in the vehicle compares the present time, vehicle present location or speed with the permitted time interval, region or speed range. The vehicle can be brought to a graceful stop if the present time or vehicle location is not within a permitted time interval or region; or the vehicle speed can be promptly brought back to its permitted range. Alternatively, the LD system compares the vehicle speed or other vehicle attribute with a permitted range for that attribute; operation of the vehicle is restricted so that the vehicle attribute is always within the permitted range. If the LD system does not receive signals sufficient to determine vehicle location or speed, one or more of the 12 Control Actions, set forth in the following, can be taken by the system.

DESCRIPTION OF BEST MODES OF THE INVENTION

Figure 1:
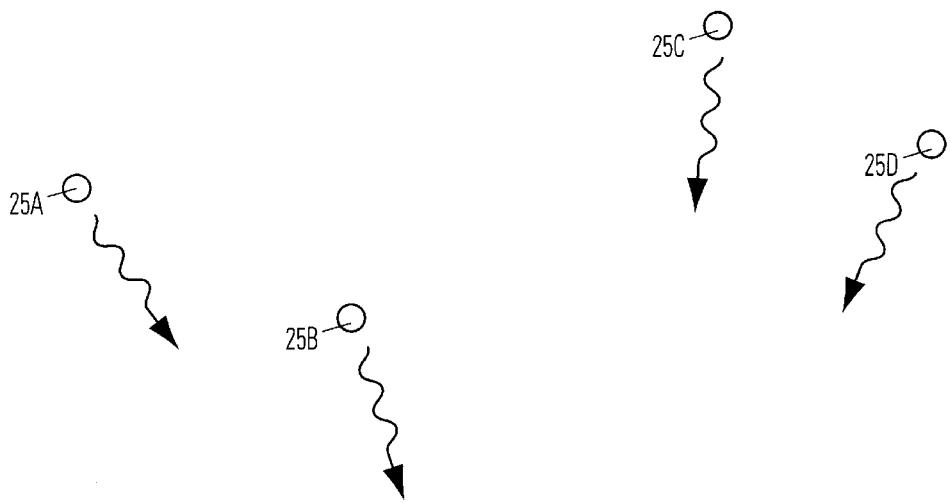
FIG. 1 is a schematic view illustrating use of the invention in two embodiments, using satellite-based or ground-based LD signal sources to provide LD signals.
Figure 1:
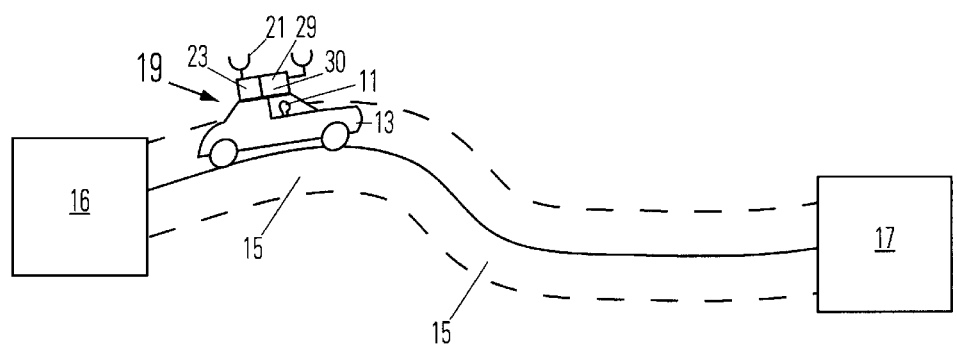

FIG. 1 illustrates practice of the invention in one embodiment. A restricted operator ("RO") 11, whose use of a vehicle 13 is restricted to one or more permitted corridors or paths 15 and is restricted to one or more selected time intervals, is shown operating the vehicle within the permitted corridor 13. The RO's use of the vehicle 13 may be restricted because: (1) the RO has (recently) been convicted of operation of a vehicle under the influence of alcohol and/or of a controlled substance or drug (a DUI offense); (2) the RO has diminished physical, mental or emotional capacity to operate a vehicle, due to illness, epilepsy or other similar infirmity; (3) the RO is of an advanced age and does not have the full set of skills or requisite reaction times to operate a vehicle, under many conditions that might be encountered on the road; (4) the RO is a very young driver who has not yet acquired the requisite driving and reaction skills to be allowed to operate the vehicle without some restrictions; or (5) the RO suffers from some other infirmity that regularly or occasionally renders the RO unable to fully control and operate a vehicle. Under such circumstances, an RO may be allowed to operate a selected vehicle within a permitted travel corridor 15 (1) to commute to and from work during restricted workday hours, (2) to travel between the RO's home site 16 and a medical practitioner's office, a pharmacy, a food store or similar essential facility 17 during restricted hours each day or (3) for similar essential purposes during restricted hours.

A location determination (LD) module 19, that is part of an LD system, such as GPS, GLONASS, LEO, Iridium or LORAN, including an LD signal antenna 21 and an LD signal receiver/processor ("receiver") 23 connected to the antenna 21, is located on the vehicle 13. When activated, the LD module 19 determines the present location, present speed (optional) and observation time (optional) of the antenna 21, and thus of the vehicle 13, in a manner well known in the art. The LD antenna 21 receives LD signals from two or more LD signal sources 25A, 25B, 25C, 25D that may be transmitting satellites or transmitting ground-based towers, or may be some other suitable source of LD signals. The present location and the present observation time for the vehicle are determined from receipt of the LD signals by methods that are well known in the art. A hybrid LD system is discussed in the following.

From time to time, the LD system may lose one or more of the LD signals and may be unable to determine the present location of the vehicle. In another embodiment of the invention, a vehicle odometer communicates with the LD system to provide a first hybrid location determination (HLD) system for determination of accumulated mileage traveled by the vehicle. Loss of one or more LD signals may be gradual, as when the vehicle travels through an urban canyon or the signals are naturally interfered with by structures (trees, hills, canyons, buildings, etc.) that are present locally. Loss of signals may also occur suddenly, due to natural causes or to intentional interference. In either instance, one or more of 12 Control Actions may be imposed, either as soon as the loss of signals occurs or whenever the signals do not return, after the vehicle has traveled a selected time interval or has traveled a selected accumulated distance, measured from the time the LD signals are first lost.

In another embodiment, a second HLD system includes a conventional LD system that works cooperatively with an inertial navigation system (INS) or dead reckoning system to estimate vehicle location, speed and/or mileage traveled. An example of an operating dead reckoning system is the Trimble Navigation Placer GPS 450/455 vehicle LD system (Sunnyvale, Calif.) that receives and uses GPS signals and (optionally) differential GPS signals and/or dead reckoning information, determines and reports vehicle location and selected status parameters to a base station, and takes one or more selected control actions (unlock/lock vehicle doors, kill the ignition, sound vehicle alarm, etc.) in response to receipt of signals from the base station.

The INS functions at all times, and its data are regularly updated, using the LD information when such information is presently available. When the LD information is lost or corrupted, the last update INS location/speed information plus the INS information accumulated since the last INS update, are used to estimate the present location and/or speed and/or accumulated mileage, using dead reckoning and other suitable techniques that are well known in the art. An example of use of cooperative use of GPS and INS signals for LD is found in U.S. Pat. No. 5,193,064, issued to Maki, incorporated by reference herein.

One method for identifying the RO or another driver uses an RO thumbprint, fingerprint, handprint, partial or full facial image, retina, iris, voice sample, cursive signature, blood vein pattern, blood sample or other suitable biometric indicium for prompt analysis and comparison with a database of stored biometric indicia. At an unpredictable sequence of times when the vehicle is operating, with a required response time interval of 1–10 seconds in length and at separation times of the order of a 60–600 seconds, the driver of the vehicle is commanded by an audio or visual interface within the vehicle to provide the driver's designated biometric indicium on a small plate or other biometric indicium receiving and analysis mechanism ("BIRAM") 27 and vehicle control system 29. The BIRAM 27 is preferably positioned at a location that is difficult to reach by anyone except a person seated behind the driver's wheel. For example, in a vehicle in which the driver's wheel is located on the left (on the right), the vehicle driver can be commanded to provide a thumbprint, fingerprint or handprint from the driver's right hand (left hand) on a plate located on the left (right) adjacent to the driver's wheel. This arrangement makes it very difficult for anyone but the vehicle driver to provide the required biometric indicium, in the short response time interval provided.

Alternatively, a scan and analysis of all or a portion of the driver's facial image, retina or iris may be performed at each of a sequence of unpredictable times while the vehicle engine is activated. This approach may require use of a system that can distinguish between a "mask" or other artificial face and a genuine face, perhaps by also performing a thermal scan of the portion of the surface of the face presented for comparison. Alternatively, the driver may be required to present a hand, arm or other appendage for a non-invasive blood or blood vein pattern scan at each of a sequence of unpredictable times while the vehicle engine is activated. Alternatively, the driver may be required to speak a selected collection of words or phrases into a voice analysis module that analyzes and compares the words or phrases with a database of already-analyzed words or phrases and attempts to match the new entry with an extant entry for an already-identified vehicle operator.

The BIRAM 27 receives a biometric indicium, presumed to be that of the vehicle driver, performs one or more suitable tests on the indicium, and compares the indicium with indicia stored in a database to determine if the indicium belongs to an identified RO, or to another identified driver. If the biometric indicium is that of the RO, the system: (1) determines if the present time is within at least one of the permitted time intervals during which the RO is permitted to operate the vehicle; and/or (2) determines if the vehicle present location and/or speed, as determined by the LD antenna and LD receiver carried on the vehicle, is within a permitted travel region and speed range corresponding to a permitted time interval that includes the present time. U.S. Pat. No. 5,485,161, issued to Vaughn, incorporated by reference herein, discloses use of an LD system to determine and display a maximum vehicle velocity allowed for the present vehicle location.

If one or both of the two preceding tests is answered in the negative, the system optionally takes at least one of 12 Control Actions: (1) the system (temporarily) disables the vehicle at a selected time so that the vehicle no longer operates, through fuel cutoff, air brake disablement or some other similar measure; (2) the system (temporarily) disables use of selected vehicle accessories, such as a winch, pump, cargo lift, cargo lock, dump mechanism, emergency lights or flashers, or door locks; (3) the system reduces the vehicle speed to a selected speed range, using a vehicle "governor" or some other suitable approach; (4) the system forces the vehicle to operate only in selected lower gears, such as first and second; (5) the system turns on at least one of the lights, exterior flashers and horn continuously or periodically; (6) the system activates an on-board alarm that is visually or audibly perceptible to a person outside the vehicle; (7) the system transmits an alarm (optionally silent) to a selected facility that is spaced apart from the vehicle; (8) the system activates an air bag or other disabling device on the driver's side of the vehicle; (9) the system allows the vehicle to operate for at most a selected cumulative time interval; (10) the system allows the vehicle to operate only within one or more selected time intervals; (11) the system allows the vehicle to operate for at most a selected cumulative vehicle mileage; and (12) the system takes no action at that time but optionally logs the activity and allows the driver to operate the vehicle without restriction for a selected time interval. Optionally, the controller connects to a display system that audibly announces or visually displays an announcement that a violation has occurred and/or that the vehicle will become disabled within a selected time interval (e.g., 30–60 sec) and/or that the driver should steer the vehicle off the road, if possible, before disablement occurs.

In an extreme situation, the vehicle may be provided with an airbag, or other driver disablement device, on the driver's side that is automatically activated if the RO attempts to operate the vehicle outside the permitted time interval or outside the permitted travel corridor. However, this approach does not provide a permanent restriction on vehicle use.

If the biometric indicium is that of another identified driver (not an RO), other restrictions on freedom of choice are optionally imposed on this driver, such as the Control Actions number (2), (3), (4), (5), (7), (9), (10), (11) and (12).

If the biometric indicium corresponds to an unidentified driver, the system optionally takes at least one of the 12 Control Actions.

Alternatively, each identified driver, including an RO, may be assigned (1) an individualized maximum vehicle speed, using a governor with a variable maximum speed installed on the vehicle and/or (2) individualized maximum accumulated vehicle mileage and/or (3) an individualized maximum accumulated vehicle operation time and/or (4) one or more individualized time intervals for vehicle operation. An unidentified driver may also be assigned one or more default limitations, drawn from the immediately preceding list, for vehicle operation.

It is possible that the biometric indicium, such as a thumbprint, fingerprint, handprint, facial scan, retinal scan, voice sample analysis, blood vein scan, blood sample scan, etc. is properly presented but is not legible or cannot be interrogated or analyzed. This might occur where the relevant thumb, finger, hand, face or eye to be scanned is cracked or otherwise disfigured, or where a voice to be scanned is distorted by illness or the like. To provide for such contingencies, each authorized and identified vehicle driver may be required to enter a sample of each of two or more qualitatively different biometric indicia from different parts of the body, for example, a thumbprint and a blood sample reading. If the first biometric indicium presented by the vehicle driver (at the present time) is not legible or readable, the system requires the driver to enter the second biometric indicium for comparison against the stored version of this second indicium.

If the vehicle driver fails to provide a legible/interrogatable biometric indicium, after a sequence of N consecutive commands (N a selected integer$\geq 1$), the system optionally takes at least one of the 12 Control Actions.

If the vehicle driver provides a biometric indicium upon receiving a command to do so, and the indicium is found not to match the RO's indicium, the vehicle driver is optionally permitted to continue to operate the vehicle but must continue to respond to the sequence of commands to provide a biometric indicium from time to time.

Each new, authorized vehicle driver will enter one or more samples of chosen biometric indicia for that person into the system, for use in subsequent driver identification. Preferably, an authorized vehicle driver, including an RO, will periodically re-enter a sample of that person's chosen biometric indicia into the system, to compensate for the tendency of a biometric indicium to change with the passage of time; re-entry might be required at intervals of 6–24 months.

In addition to, or instead of, presentation of a biometric indicium, the vehicle may require insertion or presentation of a token or smart card (referred to collectively as a "token" here) that corresponds to that vehicle, in order for the vehicle to be activated or "started." The token may have built into it a circuit or pre-programmed information in a storage medium that imposes selected restrictions on operation of the vehicle and/or that identifies the token holder. For example, the token may specify that the vehicle can be operated only within a selected geographic region, only within a selected vehicle speed range, only for a selected maximum accumulated mileage, only with one or more selected time intervals, or only for a selected maximum vehicle operation time. The token may also be specific for the person who presents the token and may require presentation of one or more biometric indicia at times during operation of the vehicle, as discussed in the preceding, to confirm the identity of the token holder. Preferably, at least part of the information contained on the token is encoded or encrypted, and the token-accepting system is programmed to decrypt or decode and use the token information, in order to minimize or eliminate the possibility that an unauthorized person could read and modify the token to permit unintended operation of the vehicle. The token may rely upon digitized data stored in a flash memory, in a (re) programmable ROM or in similar information storage media.

Alternatively, the identification indicium may be presented through a keypad entry of information that is specific to and known to only the individual who presents the information. This information may be entered as a coded sequence of characters and/or may be entered as one or more responses to questions posed by a personal interrogation system and visual/audible display that are connected to the keypad. The keypad entry system may be used in place of, or to supplement, the BIRAM and/or the token, as a means of authenticating the identity of the presenter. For ease of reference, an "ident indicium" will refer to a biometric indicium and/or to a information contained in a token and/or to information entered via a keypad, according to whatever is presented for identification.

A biometric indicium could be used to identify a vehicle driver, and a token could be used to specify which route, plurality of routes or corridor(s) are permissible for operation of the vehicle. The token could also be used to specify, for example, a vehicle destination where a vehicle load is to be delivered; and a vehicle load locking mechanism would permit "unlocking" and removal of the load only when the vehicle is located at the specified vehicle destination. Use of a GPS-based vehicle load lock/unlock system is disclosed by Long in U.S. Pat. No. 5,648,763, incorporated by reference.

A biometric indicium and a keypad entry could required to be used together, for example, to modify internal operating restriction tables for the vehicle. This would prevent anyone but an authorized system administrator from permanently or temporarily modifying (in response to an unexpected situation) these internal restriction tables. This combination of a biometric indicium and a keypad entry (or a token) could also be used to enroll a new authorized driver for the vehicle.

Figure 2A:
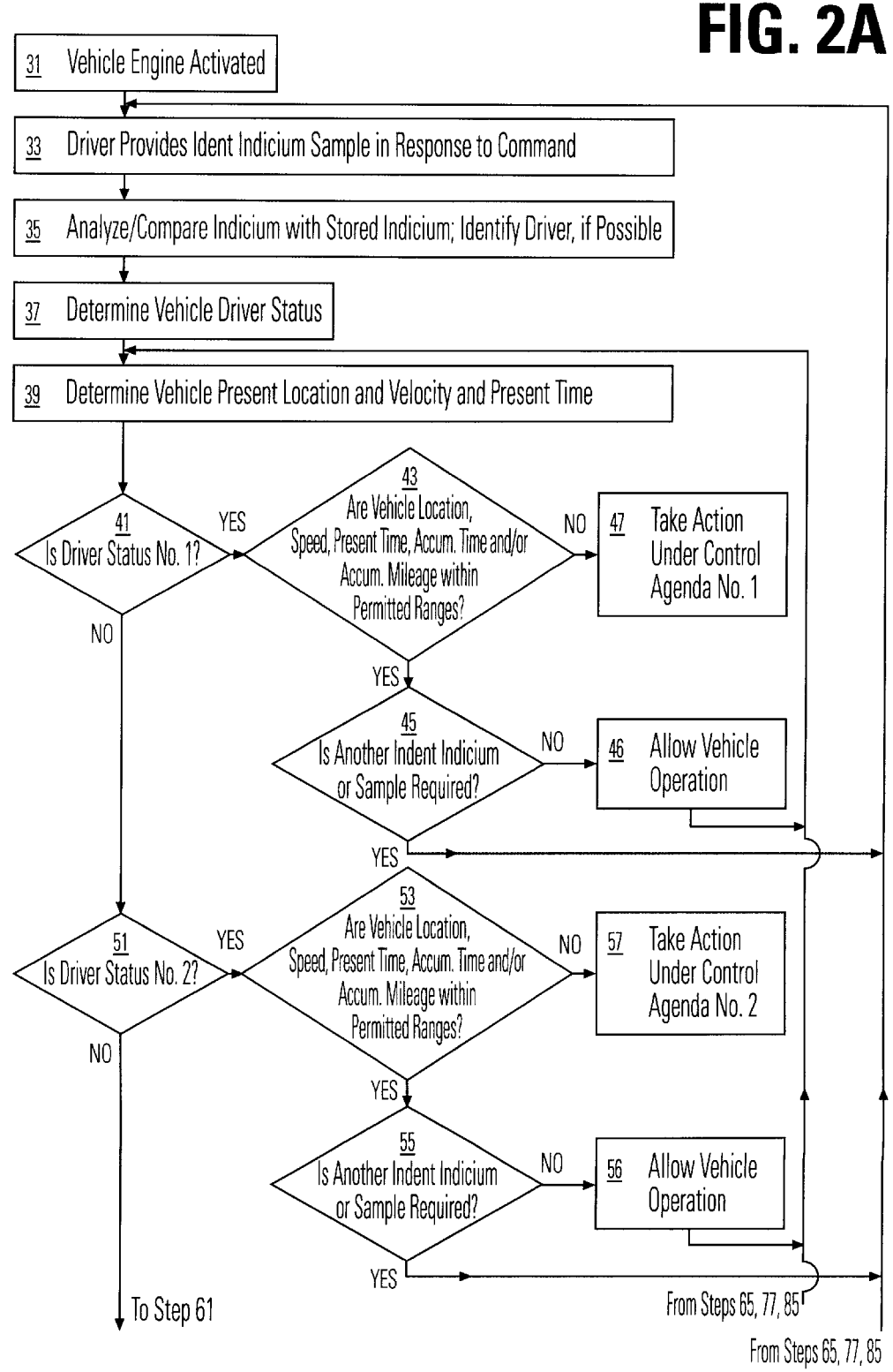
FIGS. 2A/2B, 3, 4A/4B and 5 are flow charts illustrating embodiments of the invention.
Figure 2B:
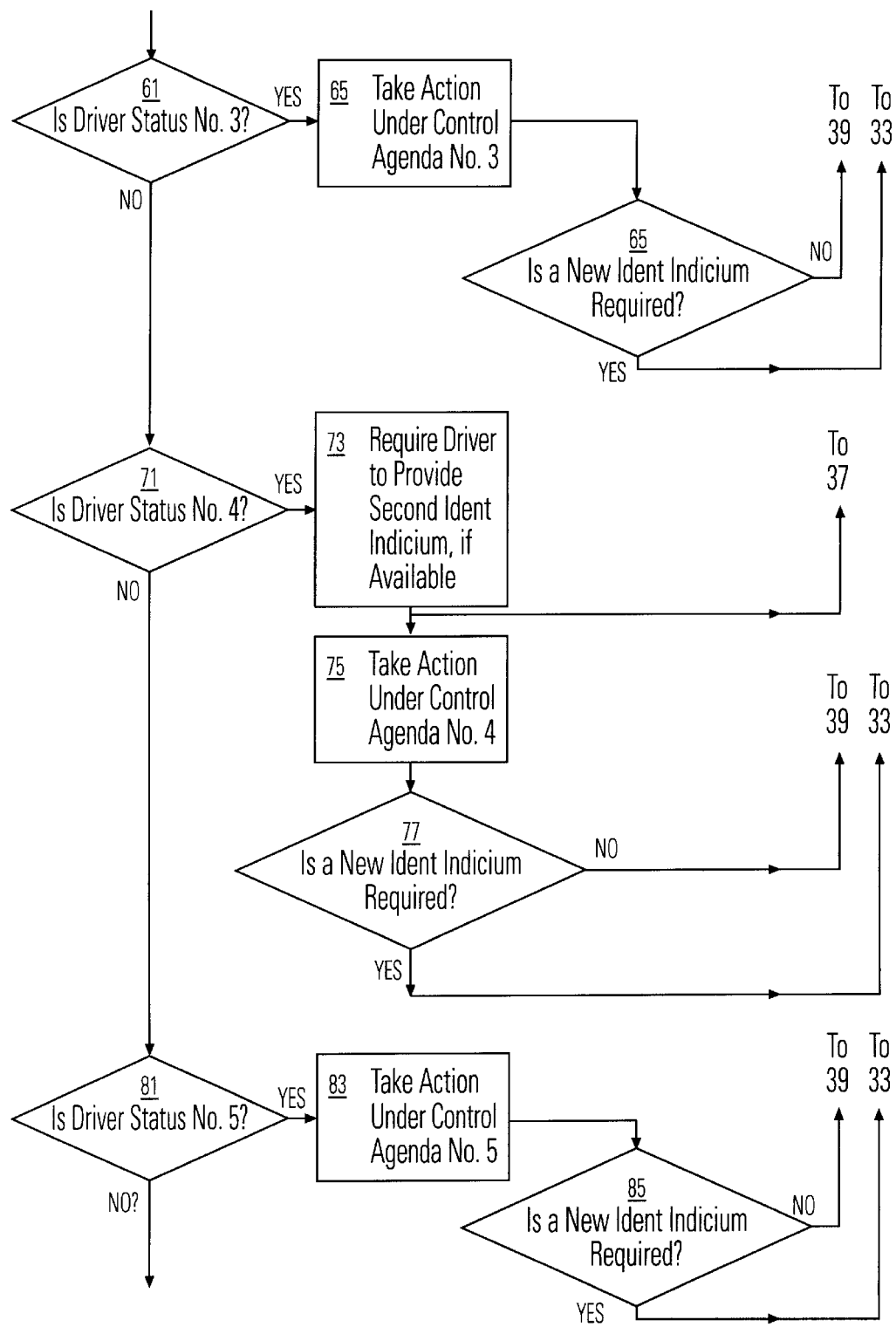

FIG. 2 is a flow chart illustrating the steps taken in one embodiment of the invention. In step 31, a vehicle driver activates the vehicle by turning on the ignition system and thereby activates the driver control system. In step 33, in response to prompting from the control system, the driver provides a sample of his/her (first) ident indicium (a biometric indicium and/or a token or keypad entries). The order of steps 31 and 33, among others, can be reversed or varied. In step 35, the control system either (i) identifies the driver, based on the ident indicium presented, or (ii) determines that the driver cannot be identified, because (ii/a) determines that the ident indicium presented is not in the control system database, (ii/b) determines that the ident indicium presented is not legible or readable, or (ii/c) determines that no ident indicium is presented.

In step 37, the control system determines the status of the driver, based on the biometric indicium: (1) RO; (2) identified and authorized, but not an RO; (3) unidentified or unauthorized; (4) non-identifiable because of poor quality of ident indicium presented by driver; and (5) ident indicium not presented. The control system determines the present vehicle location, vehicle speed (optional) and time, in step 39.

In step 41, the control system determines if the driver has status no. 1. If the answer to the question in step 41 is "yes", the system determines, in step 43, (i) whether the vehicle location and/or speed are within permitted ranges for the RO and (ii) whether the present time and/or accumulated time or mileage are within permitted ranges for the RO. If the answers to question (i) and to question (ii) in step 43 are both "yes," the system allows the RO to continue to operate the vehicle., in step 46, by enabling the ignition circuit so that the engine can be started.

In step 45, the system optionally determines whether a new ident indicium or sample is now required. This requirement will recur at unpredictable times. If the answer to the question in step 45 is "no," the system recycles to step 39 and continues. If the answer to the question in step 45 is "yes," the system recycles to step 33 and continues.

If the answer to question (i) or question (ii), or both, in step 43 is "no," the control system moves to step 47 and takes action according to Control Agenda no. 1. Control agenda no. 1 may include any or all of the 12 Control Actions that is consistent with restricting the RO's operation of the vehicle. Optionally, the system recycles to step 39 or to step 33.

If the answer to the question in step 41 is "no,", the control system moves to step 51 and determines if the driver has status no. 2 (driver identified and authorized; not an RO). If the answer to the question in step 51 is "yes," the system determines, in step 53, (i) whether the vehicle location and/or speed are within permitted ranges for the driver and (ii) whether the present time and/or accumulated time or mileage are within permitted ranges for the driver. If the answers to question (i) and to question (ii) in step 53 are both "yes," the system allows the driver to continue to operate the vehicle., in step 56, by enabling the ignition circuit so that the engine can be started.

In step 55, the system optionally determines whether a new ident indicium or sample is now required. This requirement will recur at unpredictable times. If the answer to the question in step 55 is "no," the system recycles to step 39 and continues. If the answer to the question in step 55 is "yes," the system recycles to step 33 and continues.

If the answer to question (i) or question (ii), or both, in step 53 is "no," the control system moves to step 57 and takes action according to Control Agenda no. 2. Control agenda no. 2 may include any or all of the 12 Control Actions that is consistent with restricting the driver's operation of the vehicle. Optionally, the system recycles to step 39 or to step 33.

If the answer to the question in step 51 is "no," the control system moves to step 61 and determines if the driver has status no. 3 (driver not identified or not authorized). If the answer to the question in step 61 is "yes," the system takes action according to Control Agenda no. 3, in step 63. Control Agenda no. 3 may include any or all of the 12 Control Actions that is consistent with restricting the driver's operation of the vehicle.

In step 65, the system optionally determines whether a new ident indicium or sample is now required. This requirement will recur at unpredictable times. If the answer to the question in step 65 is "no," the system recycles to step 39 and continues. If the answer to the question in step 65 is "yes," the system recycles to step 33 and continues.

If the answer to the question in step 61 is "no," the control system moves to step 71 and determines if the driver has status no. 4 (ident indicium presented is illegible or unreadable). If the answer to the question in step 71 is "yes," the system optionally requires the driver to provide a second sample of an ident indicium (qualitatively different from the first sample of an ident indicium, as discussed previously), in step 73. Optionally, the system then returns to step 37, examines the second ident indicium and continues. If the driver has exhausted the inventory of his/her ident indicium entered and stored in the control system the system takes action according to Control Agenda no. 4, in step 75. Control agenda no. 4 includes any or all of the 12 Control Actions that is consistent with restricting the driver's operation of the vehicle.

In step 77, the system optionally determines whether a new ident indicium or sample is now required. This requirement will recur at unpredictable times. If the answer to the question in step 77 is "no," the system recycles to step 39 and continues. If the answer to the question in step 77 is "yes," the system recycles to step 33 and continues.

If the answer to the question in step 71 is "no," the control system moves to step 81 and determines if the driver has status no. 5 (no ident indicium presented by the driver). If the answer to the question in step 81 is "yes," the system moves to step 83 and takes action according to Control Agenda no. 5, in step 73. Control agenda no. 5 includes any or all of the 12 Control Actions that is consistent with restricting the driver's operation of the vehicle.

The system then moves to step 85 and optionally determines whether a new ident indicium or sample is now required. This requirement will recur at unpredictable times. If the answer to the question in step 85 is "no," the system recycles to step 39 and continues. If the answer to the question in step 85 is "yes," the system recycles to step 33 and continues.

The five status conditions no. 1, no. 2, no. 3, no. 4 and no. 5 are substantially mutually exclusive and are intended to cover all the possibilities so that at least one of the questions posed by the control system in steps 41, 51, 61, 71 and 81 should be answered "yes." For this reason, the path leading from step 81 for which the answer is "no" may be redundant, and the step 81 may be deleted, if desired.

Receipt and analysis of a sample of an ident indicium from a vehicle driver may also be used to determine whether the driver may operate a vehicle that is carrying certain restricted material. This restricted material may be a hazardous material or hazardous waste, such as nuclear fuel rods containing U235 or Pu239, carbon tetrachloride or diethylstilbestrol or trichloroethylene, or mixtures thereof, or other materials designated as hazardous or requiring special handling. Alternatively, this restricted material may be documents or computer-readable files containing confidential or commercially proprietary information or evidentiary information whose custody must be restricted. In this instance, a vehicle driver is either (1) identified and authorized or (2) unauthorized. The driver is directed to provide a sample of a biometric indicium for receipt and analysis by a control system installed on the vehicle. If the driver is found to be identified and authorized, the vehicle is allowed to move along a selected permitted travel corridor and within a selected permitted travel time interval, where the present vehicle location and/or present time are provided by a location determination (LD) unit carried on the vehicle.

Receipt of an ident indicium ("first sample"), preferably a biometric indicium, and transmission of a representation of this first sample can be used to provide access to a selected vehicle in a fleet of vehicles. The fleet may be a fleet of rental vehicles or a fleet of vehicles maintained by a business entity for use by its employees. An ident indicium, for example, a thumbprint, fingerprint, eye scan or voice print, is presented at a central station by a person who proposes to use a vehicle from the fleet. A particular vehicle is chosen, and a representation of the first sample is transmitted to an identification module located in the chosen vehicle. When the person arrives at the chosen vehicle, a second sample of the same ident indicium is presented by the person to this identification module and is analyzed and compared with the representation of the first sample received by transmission from the central station. If the first and second sample representations substantially agree, the identification module allows access to the chosen vehicle by the identified person. If the first and second sample representations do not substantially agree, access is denied and, optionally, an alarm is transmitted to the central station or elsewhere. This approach (1) allows each vehicle in a fleet to be secured at all times and (2) allows only an already-identified person to gain access to a chosen vehicle. Alternatively, the first sample may be received and stored, and only the second sample need be subsequently presented to gain access to a specified vehicle in a group of vehicles, or to allow the identified person to subsequently operate the vehicle during the time interval (hours, days, weeks) for which use of this vehicle is authorized.

Alternatively, the vehicle driver of a land vehicle, a waterborne vehicle or an airborne vehicle may be restricted, statutorily, by regulation or because of empirical data, to operation of the vehicle for at most a specified limit on the number of consecutive hours without a rest for a time interval of at least specified length. As the number of consecutive hours of vehicle operation approaches the specified limit, the driver can be advised, using a visually perceptible and/or audibly perceptible presentation device, that this specified limit is being approached. Optionally, the vehicle can be disabled (or some other suitable penalty imposed) when this specified limit is exceeded.

If the driver is found to be unauthorized, based on a biometric indicium presented or withheld, the vehicle use control system can take any or all of the 12 Control Actions.

Figure 3:
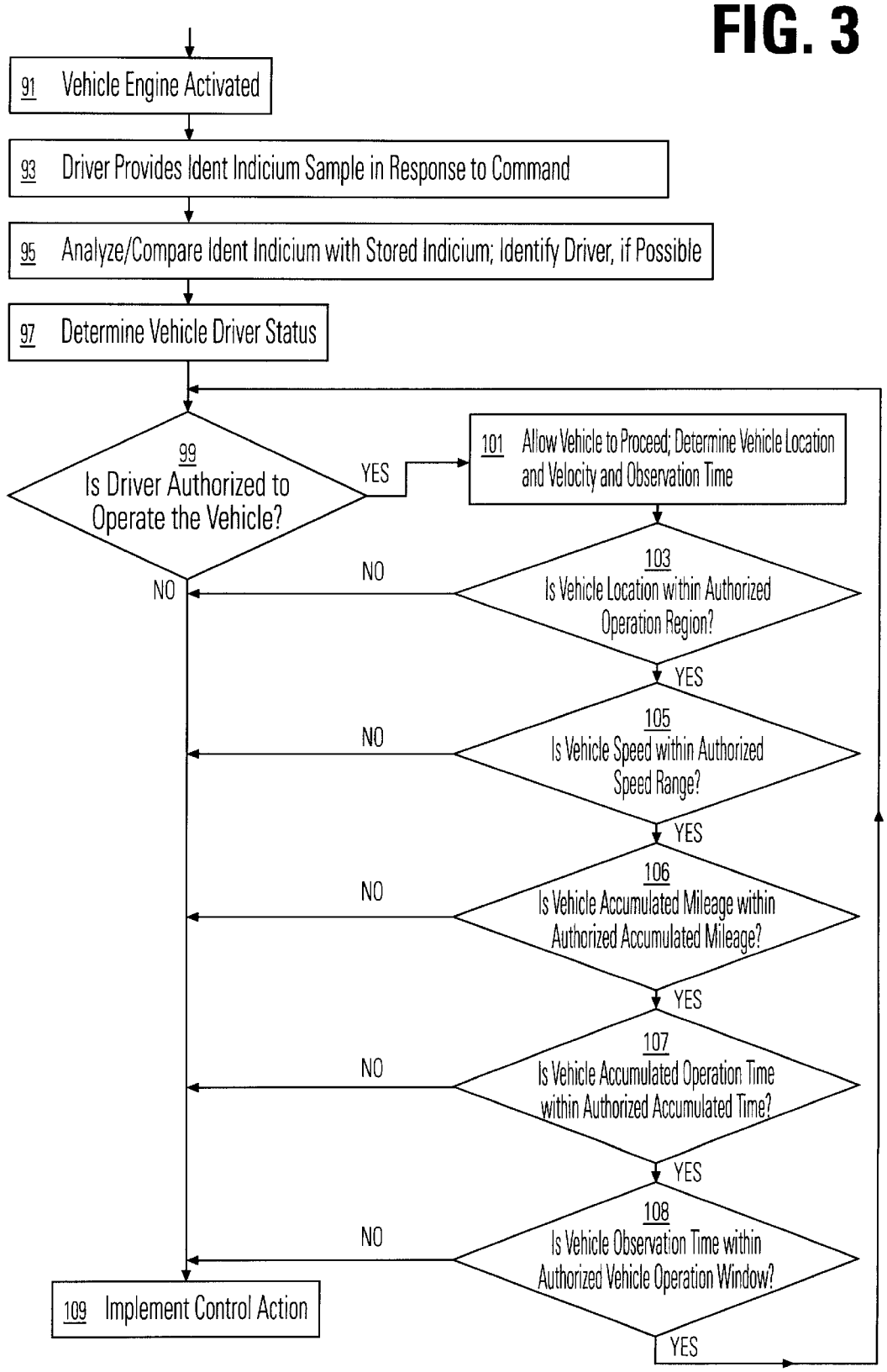

FIG. 3 is a flow chart illustrating the steps taken in this embodiment of the invention. In step 91, a vehicle driver activates the vehicle engine and thereby activates the driver control system. In step 93, in response to prompting from the control system, the driver provides a sample of his/her (first) ident indicium. The order of steps 91 and 93, among others, can be reversed or varied. In step 95, the control system either (i) identifies the driver, based on the ident indicium presented, or (ii) determines that the driver cannot be identified, because (ii/a) the ident indicium presented is not in the control system database, (ii/b) the ident indicium presented is not legible or readable, or (ii/c) no ident indicium is presented.

In step 97, the control system determines the status of the driver, based on an ident indicium presented, if any. In step 99, the system determines whether the driver is authorized to operate the vehicle. Here, only the status (i) in step 95 is acceptable.

If the ident indicium was presented by the driver and can be identified, and if this ident indicium corresponds to an authorized operator of the vehicle, the answer in step 99 is "yes," and the driver is allowed to operate the vehicle, in step 101; the system determines the vehicle present location and speed (optional) and observation time (optional). In step 103 (optional), the system determines if the vehicle location is within an authorized vehicle operation corridor or region. If the answer to the question in step 103 is "yes," the system optionally determines whether the vehicle speed is within an authorized speed range, in step 105. If the answer to the question in step 105 is "yes," the system optionally determines whether the vehicle accumulated mileage (since vehicle mileage accumulation began) is within the authorized accumulated mileage range, in step 106. If the answer to the question in step 106 is "yes," the system optionally determines if the vehicle accumulated operation time (since vehicle operating time accumulation began) is within the vehicle authorized accumulated time range, in step 107. If the answer to the question in step 107 is "yes," the system optionally determines if the (present) observation time is within an authorized operation window, in step 108. If the answer to the question in step 108 is "yes," the system returns to step 99 or to another suitable step in the procedure.

If (i) the ident indicium is not that of an authorized driver, (ii) the ident indicium presented by the driver cannot be identified, (iii) the ident indicium presented is not legible or readable, or (iv) no acceptable ident indicium is presented, the answer to the question in step 99 is "no." If the answer to any of the questions in steps 99, 103, 105, 106, 107 and 108 is "no," the system moves to step 109 and implements one or more of the 12 Control Actions, as appropriate.

In the procedures illustrated in FIGS. 2 and 3, the control system optionally allows the vehicle driver to "miss" presenting up to consecutive number N−1 ($\geq$1) of ident indicium samples while the vehicle is operating. Preferably, the driver is required to respond to the first command to present a ident indicium sample, which command will be issued at or around the time the vehicle is activated. If the driver "misses" responding to N of these commands, the control system takes one or more of the 12 Control Actions, including optionally transmitting an alarm signal, including the present location of the vehicle, is to the local law enforcement authorities and/or to the "owner" of the restricted material carried on the vehicle. If the driver presents an ident inidicium sample but the sample is illegible or non-readable because it was presented too hurriedly, presentation of this illegible or unreadable sample is counted as a "miss." Optionally, if the driver does not present an ident indicium in response to one or more consecutive requests or commands to do so, the time $\Delta t$ between any two consecutive subsequent requests can be successively shortened until the driver responds or N consecutive requests are "missed," whichever first occurs.

The embodiment corresponding to FIG. 3 can be implemented to ensure that only a relatively small group of authorized personnel is permitted to unrestrictedly drive a particular vehicle, or any of a fleet of such vehicles. For example, this embodiment can be implemented to ensure that only a police officer can unrestrictedly drive any of a designated fleet of police vehicles; or that only a trained and authorized hazardous substance handler can operate a land, waterborne or airborne vehicle that actually transports hazardous substances.

The invention can also be used to monitor operation of the vehicle by a teenager or other inexperienced driver, with restrictions imposed upon vehicle operation channel, total vehicle mileage, vehicle maximum speed and/or time interval of operation of the vehicle. An automobile insurance company might even provide a discount on premiums covering operation of the vehicle by an RO, where the vehicle has this system installed and operating.

Optionally, the system can maintain its own operations log, including periodic recording of the present observation time, vehicle location and/or vehicle speed in a memory that cannot be modified and that cannot be read out without presentation of a confidentially maintained access code.

Where the system is provided with a vehicle operation window, one or more time intervals within which operation of the vehicle 13 is permitted by the RO, the system optionally provides a display that visually displays a permitted time interval PTI and the present time on a screen or monitor 181 (FIG. 6) or audibly displays or present this information using a loudspeaker 182 (FIG. 6) so that the vehicle driver is made aware of how much time remains for vehicle operation within the permitted time interval or window. This may be desirable in an electrically-powered or hybrid-powered vehicle.

The permitted time interval window of operation, the permitted range of vehicle location coordinates, the permitted vehicle speed range and/or the permitted accumulated vehicle mileage range for a trip can be changed remotely, using the communications module 30 or can be changed at the vehicle 13 by use of a confidentially maintained access code, using a keypad or other data entry device. This provides flexibility, for example, where the vehicle or RO is unexpectedly called upon to provide a service that was not contemplated when the permitted time intervals and ranges were originally set for the vehicle and/or for the RO.

Figure 4A:
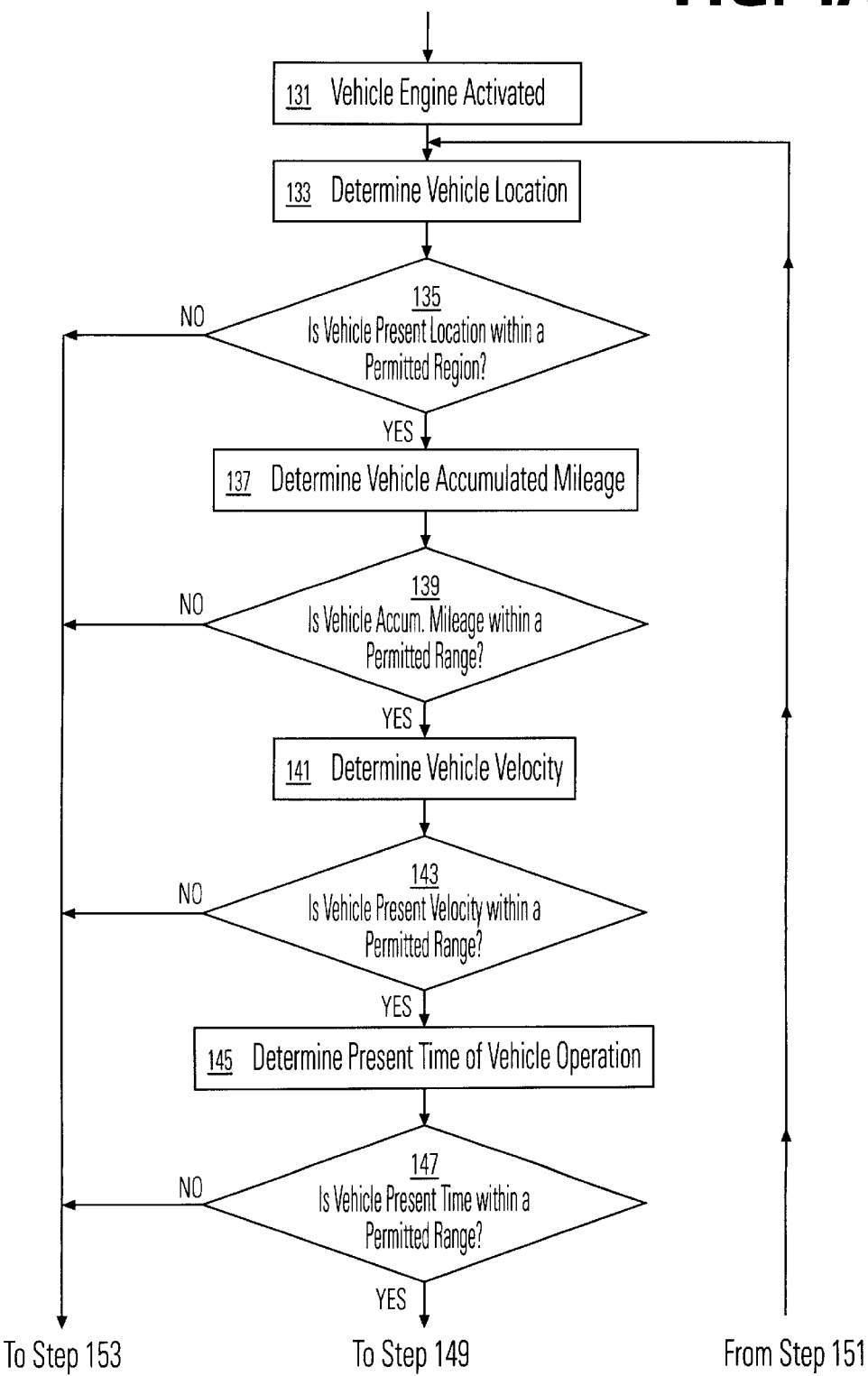
Figure 4B:
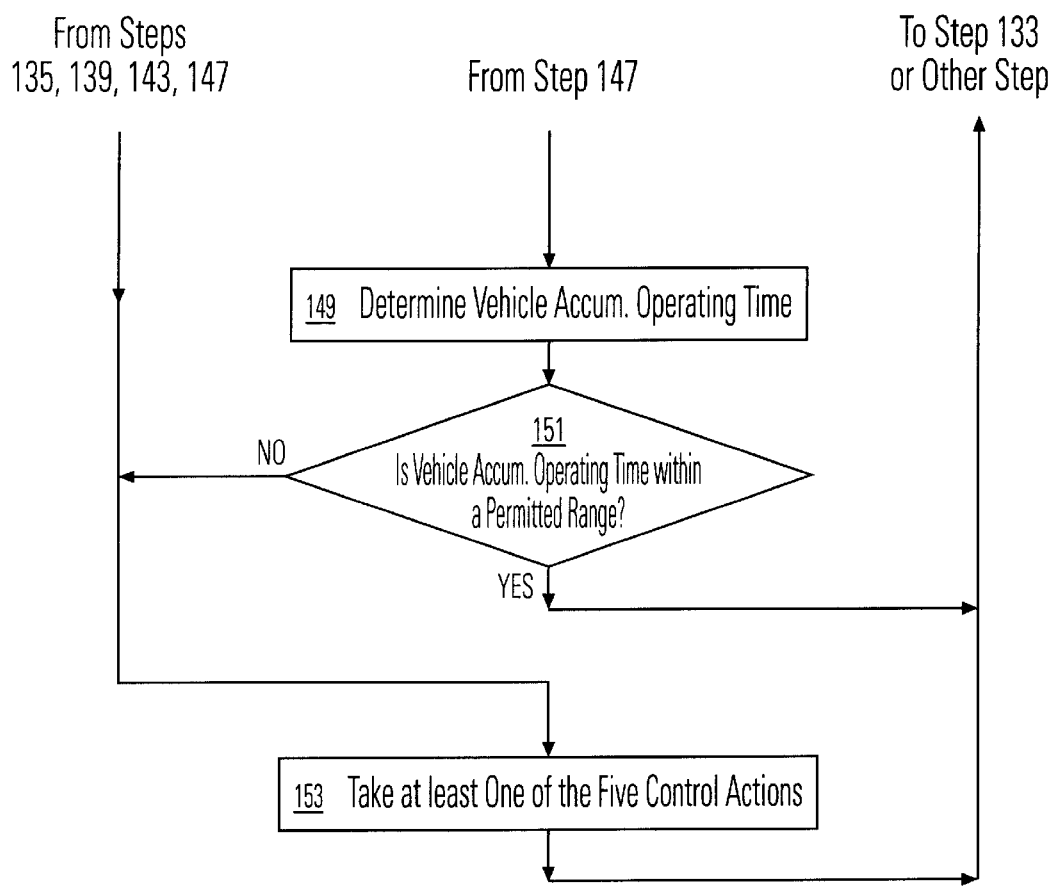

Conditions for operation of the vehicle 13 (FIG. 1) may also be imposed irrespective of who operates the vehicle. These conditions may include restrictions: on the geographical region where the vehicle is operated; on the accumulated mileage the vehicle can travel after the vehicle is activated; on the vehicle speed; on the time intervals during which a vehicle can be operated; and/or on the accumulated time for vehicle operation. FIGS. 4A/4B are a flow chart illustrating this embodiment. In step 131, a vehicle driver activates the vehicle (engine) and thereby activates the driver control system. In optional steps 133 and 135, the system determines the vehicle present location and determines whether the vehicle location is within a permitted geographic region for vehicle operation. The permitted region may include one, two or many isolated component regions. If the answer to the question in step 135 is "no", the system moves to step 153.

If the answer to the question in step 135 is "yes", the system moves to optional steps 137 and 139. In steps 137 and 139, the system determines the accumulated mileage the vehicle has traveled after the vehicle is activated or moved and determines whether this accumulated mileage exceeds a selected threshold mileage. If the answer to the question in step 139 is "yes", the system moves to step 153.

If the answer to the question in step 139 is "no", the system moves to optional steps 141 and 143. In steps 141 and 143, the system determines the vehicle present speed and determines whether the vehicle speed is within at least one permitted time interval for vehicle operation. If the answer to the question in step 143 is "no", the system moves to step 153.

If the answer to the question in step 143 is "yes", the system moves to optional steps 145 and 147. In steps 145 and 147, the system determines the present time and determines whether the present time is within at least one permitted time interval for vehicle operation. If the answer to the question in step 147 is "no", the system moves to step 153.

If the answer to the question in step 147 is "yes", the system moves to optional steps 149 and 151 and determines whether the accumulated vehicle operating time (since the vehicle was last activated) is within at least one permitted range for such accumulated operating time. If the answer to the question in step 151 is "no", the system moves to step 153. If the answer to the question in step 151 is "yes", the system optionally recycles to step 133 or some other appropriate preceding step in the sequence.

In step 153, the system takes at least one of the 12 Control Actions and optionally returns to step 133 or an appropriate preceding step in the sequence.

Figure 5:
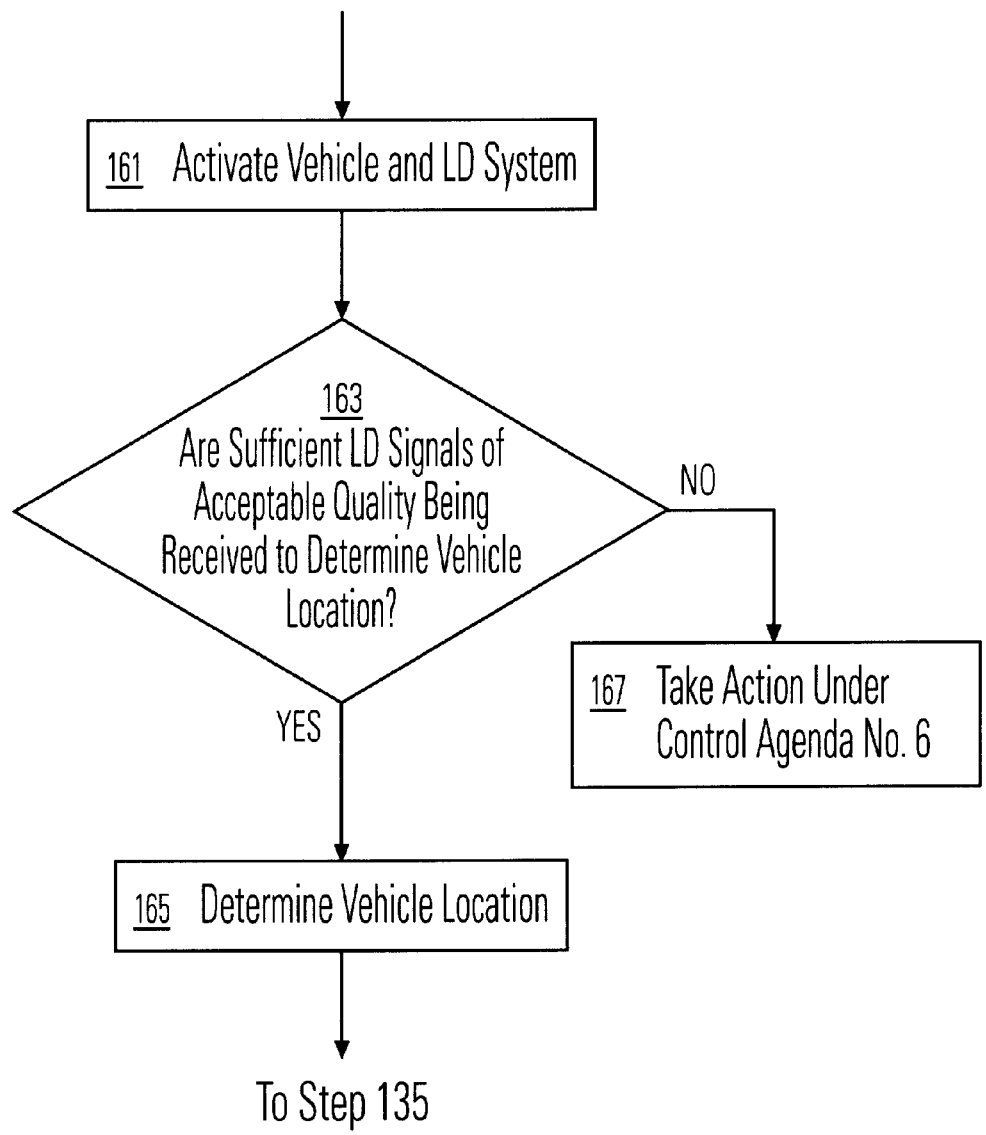

FIG. 5 is a flow chart illustrating this enhancement of the invention. In step 161, the vehicle engine is activated. In step 163, the system determines if sufficient LD signals of acceptable quality are being received so that the vehicle location can be determined. If the answer to the question in step 163 is "yes", the system moves to step 39 in FIG. 2A, to step 101 in FIG. 3, or to step 133 in FIG. 4A, as the case may be, determines the vehicle present location (step 165 in FIG. 5), and continues with the remaining steps (e.g., 135 in FIG. 4A) of the embodiment chosen. If the answer to the question in step 163 is "no", the system takes action under a Control Agenda No. 6, in step 167, where the system may take one or more of the 12 Control Actions, as discussed in the preceding paragraph. The steps 163–167 may replace step 139 in FIG. 2A, step 101 in FIG. 3 and/or step 133 in FIG. 4A.

Figure 6:
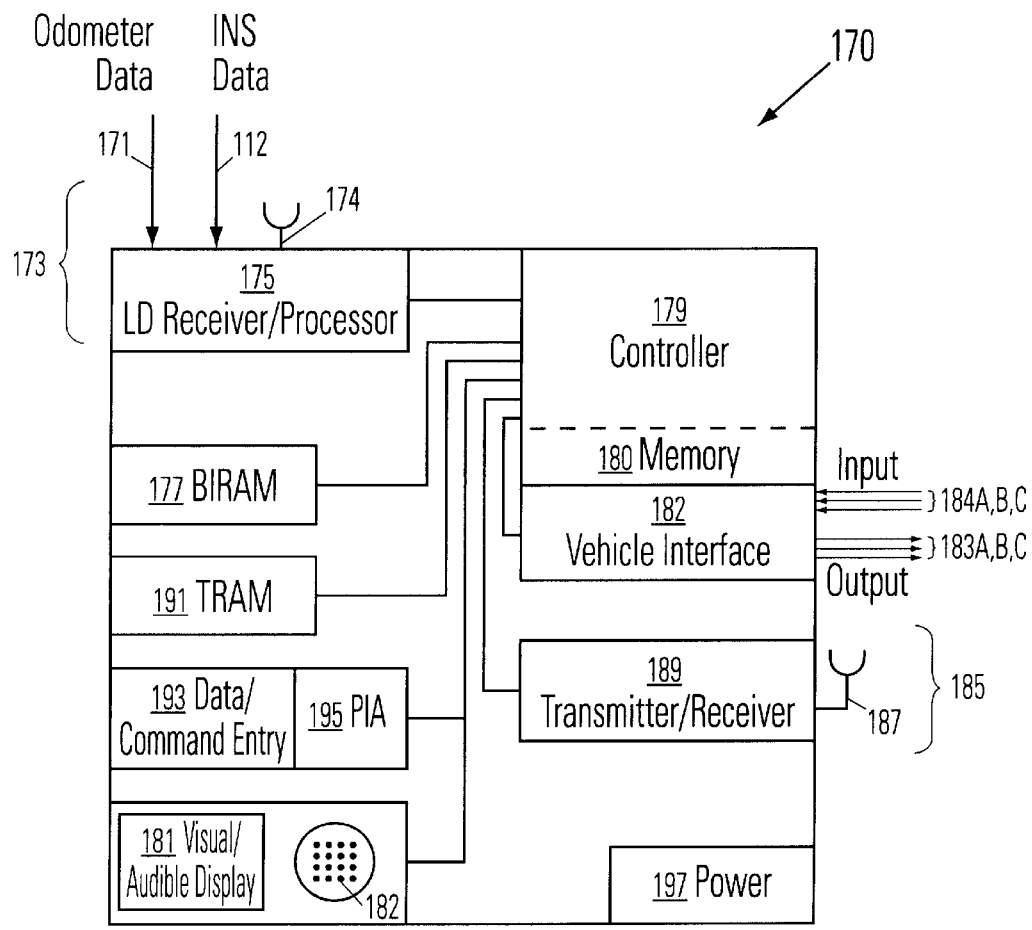
FIG. 6 is a schematic view of apparatus suitable for practicing the invention.

FIG. 6 schematically illustrates apparatus 170 suitable for practicing the invention. The apparatus 170 includes an LD module 173, including an LD signal antenna 174 and associated LD signal receiver/processor 175, that receive and analyze LD signals to determine present location and/or present speed of the LD antenna. A biometric indicium receiving and analysis mechanism (BIRAM) 177 receives from a vehicle operator or otherwise measures a biometric indicium at one or more selected times. Information obtained by the BIRAM 177 from the biometric indicium presented, if any, is sent to a controller module 179 and associated memory module 180 to determine, where possible, the identity of a vehicle operator who has presented the indicium. Where presentation of a biometric indicium is not required in order to operate the vehicle, the BIRAM 177 can be deleted.

The apparatus 170 optionally includes an input terminal 171 to receive information from a vehicle odometer (not shown) or similar distance indicating device to supplement information provided by LD signals received by the LD module 173. The apparatus 170 optionally includes an input terminal 172 to receive information from an inertial navigation device INS (not shown) or similar location indicating device to supplement information provided by LD signals received by the LD module 173.

Information on the present vehicle location and/or vehicle speed and/or time and/or accumulated operating time and/or accumulated mileage is sent by the LD module 173 to the controller module 179 at one or more selected times for comparison of this information with any vehicle operation restrictions that may be imposed on an identified or unidentified vehicle operator, based on biometric indicium information, if any, received by the controller module from the BIRAM 177. Where one or more vehicle operation restrictions are imposed by the controller module 179, these restrictions are optionally displayed visually and/or audibly to the vehicle operator, using a visual and/or audible display module 181.

The controller module 179 is also connected to a vehicle interface module 182 that is in turn connected to at least one vehicle component, such as vehicle engine, vehicle transmission system, vehicle fuel supply, vehicle power supply and accessories (considered as part of the vehicle), for use in controlling or restricting operation of the vehicle. The vehicle interface 182 optionally includes one or more interface output terminals 183A, 183B, 183C that connect to the vehicle components to be controlled. The vehicle interface 182 optionally includes one or more interface input terminals 184A, 184B, 184C that connect to a possibly different group of vehicle components (doors, ignition, alarm system, vehicle cargo, accessories, etc.) whose activation may indicate that someone is preparing to drive the vehicle, which would activate a driver interrogation sequence. The vehicle interface 182 and associated information bus may, if desired, be provided according to the serial data communications standards between microcomputers in a vehicle, as set forth in S.A.E. Documents J1708 and J1587, The controller module 179 includes a specially programmed computer to carry out the tasks assigned to the controller module; the controller module 179 and LD module 173 may coincide or both be parts of a larger module that includes a computer.

The apparatus 170 also includes a telecommunication module 185 (optional), including an antenna 187 and associated receiver/transmitter 189 that exchanges information signals with an information processing facility (not shown) that is spaced apart from the apparatus 170. The information processing facility can transmit signals that modify, add or delete vehicle operation restrictions, for receipt by the apparatus 170, and that allow downloading of commands that alter restrictions on present location, speed and/or present time, accumulated operating time and accumulated mileage items that determine the conditions under which a vehicle operation restriction is imposed. Downloading of modifying information to a portable, integrated GPS and cellular phone transceiver is available with the Trimble Navigation CrossCheck AMPS Cellular Unit (Sunnyvale, Calif.). Suitable telecommunication systems here include cellular phone, trunked radio, unlicensed radio band, packet radios in LAN or MAN or WAN operation and the like. The present invention allows downloading from a remote facility to modify or add to the extant parameters for vehicle operation or for vehicle driver identification, where the parameters are included in operating code, stored data and the like.

The apparatus 170 includes an optional token receiving and analysis mechanism (TRAM) 191 that receives and analyzes a token, presented by a would-be vehicle driver, containing personal information on the (putative) token holder and/or information on limitations under which the token holder can operate a vehicle. Information obtained by the TRAM 191 is communicated to the controller 179 for implementation and/or for comparison of the identity of the token holder with a database of authorized vehicle operators.

The apparatus 170 includes an optional data entry module 193 (keypad, floppy drive, CD ROM drive, etc.), for entry of information and response to commands, and a personal information analysis (PIA) module 195 that analyzes the information entered through the data entry module 193, in order to identify the person who enters this information and/or to add or modify information already recorded. Information obtained by the PIA module 195 is sent to the controller 179 for implementation and/or for comparison of the identity of the token holder with a database of authorized vehicle operators.

A power supply 197 supplies power to operate one or more of the other components of the apparatus 170.

The apparatus 170 can be installed in the vehicle dashboard or elsewhere in the vehicle. Alternatively, the apparatus 170 can be provided as a stand-alone device that communicates directly with at least one of the vehicle engine, vehicle transmission system, vehicle fuel supply, selected vehicle accessories and vehicle power supply so that the vehicle will not operate unless the apparatus 170 is present and active.

Figure 7:
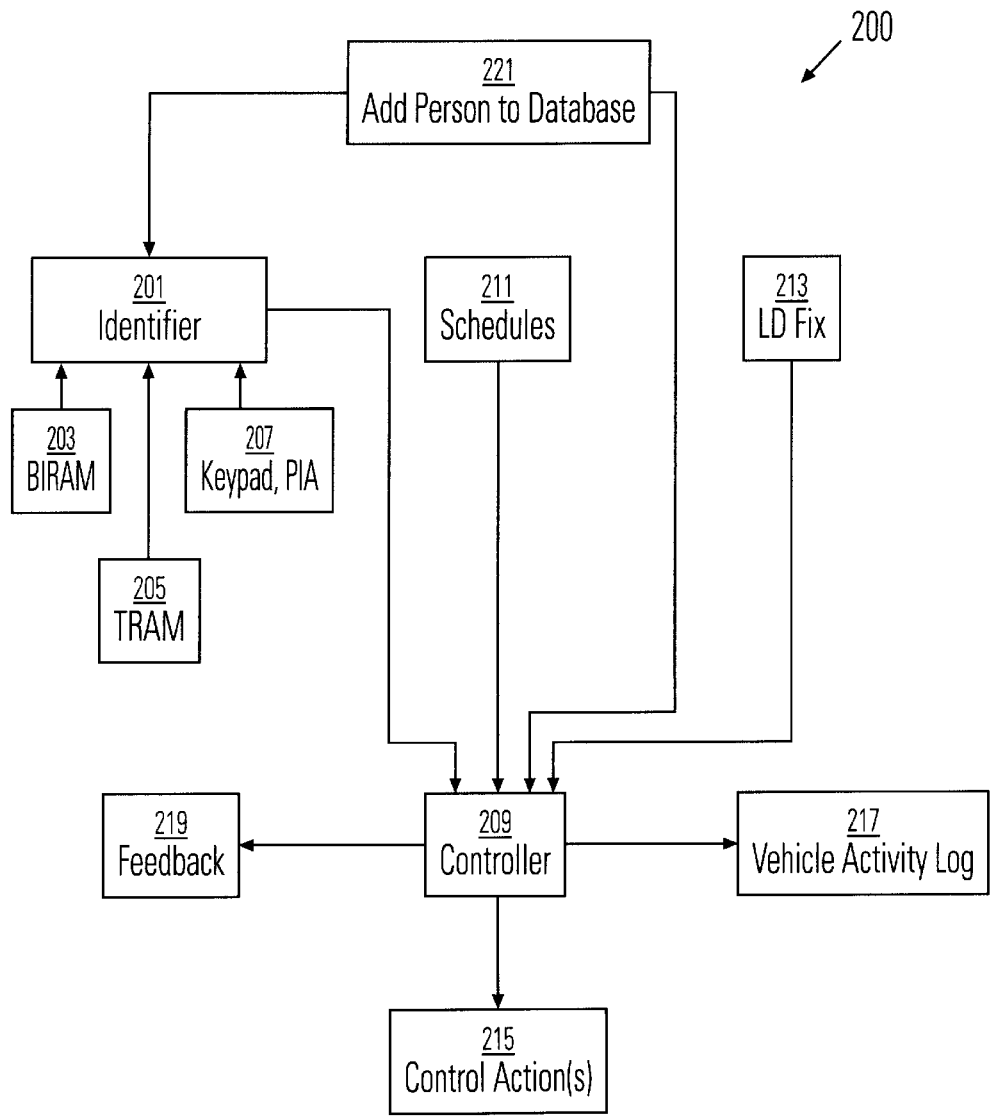
FIG. 7 illustrates a vehicle use system according to the invention.

FIG. 7 illustrates operation of one embodiment of a vehicle use control system 200 for control of use of a vehicle. Information from biometric samples, tokens and/or keypad entries presented for identification of a would-be vehicle operator are received by an identifier module 201 from one or more of a BIRAM 203, a TRAM 205 and a data entry device and PIA module 207 (keypad, floppy diskette reader, CD ROM reader or the like). The identifier module 201 analyzes the ident indicium or indicia presented and transmits the ident information, or a representation thereof, to a controller 209, which includes a computer and a memory unit that contains a database with identities and matching indicia for one or more authorized drivers of the vehicle. The controller 209 receives information from a schedule module 211 that contains various limitations on vehicle operation for each authorized vehicle operator and, optionally, "default" limitations applicable to one or more unidentified vehicle drivers. The schedule module 211 optionally includes limitations on geographic regions, corridors or routes where the vehicle may be driven, one or more permitted time intervals during which the vehicle may be operated, one or more permitted speed ranges for operation of the vehicle, and one or more limitations on vehicle transmission ranges permitted for operation of the vehicle.

The system 200 also includes an LD fix module 213 that uses location determination techniques to determine the present location and/or the present speed and/or the present (observation) time for the vehicle. The LD fix module 213 communicates this information to the controller module 209. The controller module 209 determines which Control Action (s), if any, should be imposed on vehicle use and communicates this information to a Control Action interface module 215 for implementation by the vehicle engine, transmission, fuel supply, braking system, air bag system, vehicle accessory or other appropriate system on the vehicle. The controller 209 optionally communicates vehicle operation information to a vehicle activity log module 217 that receives and stores information on vehicle location and/or vehicle speed and/or observation time for subsequent review and analysis if desired. The controller module 209 optionally communicates one or more limitations to be imposed on the vehicle and its driver to a feedback module 219 for visually or audibly perceptible presentation to the driver. The controller module optionally includes a data transfer module 221 that allows information on vehicle activity that has been logged to be copied from or removed from the system for subsequent analysis or storage.

If an additional person is to be added to the list of authorized drivers of the vehicle, the name and other relevant details about this person are added to the system using the data transfer module 221, which communicates with at least one of the identifier module 201 and the controller module 209. The person whose name is to be added may be called upon to supply one or more biometric indicia through the BIRAM 203 and/or one or more tokens through the TRAM 205 and/or one or more data entries through the PIA module 207, which information is then analyzed and provided for storage in the controller 209.

For each authorized driver whose name or other identifying characteristics are contained in the database that is part of the controller module 209, information in one or more of the following categories may be stored in the database: (1) name or other identifier; (2) corresponding ident indicium or indicia; (3) schedule applicable to driver; (4) actual range of vehicle locations; (5) actual range of vehicle speed; (6) actual times of vehicle operation; (7) present "state" of the vehicle (vehicle loaded/unloaded, type or vehicle load, passengers present, etc.); and (8) corresponding Control Actions applicable to various circumstances. This information may be contained in the controller module 209 and/or the schedule module 211 and/or the vehicle activity log module 217.

Some portions of the preceding detailed description are presented in terms of procedures, logic blocks, processing and other symbolic representations of operations on information bits within a microprocessor. These descriptions and representations are the means used by those skilled in the data processing arts to most effectively convey the substance of their work to other skilled in the art. In the present application, a procedure, logic block, process or other symbolic representation is contemplated to be a self-consistent sequence of steps or instructions leading to a desired result. The steps are those requiring physical manipulations of values representing physical quantities. Often, these values take the form of electrical or magnetic signals that can be stored, transferred, logically combined, compared and otherwise manipulated in a computer system. It is convenient at times to refer to these signals as bits, bytes, elements, symbols, characters, terms, number and the like.

All of these terms and similar terms are to be associated with the corresponding physical quantities and are merely convenient labels associated with the physical quantities. Unless specifically stated otherwise, discussions that utilize terms such as "receiving," "transmitting," "measuring," "estimating," "computing," "performing" and "determining" and the like refer to actions and processes of a computer system or other similar electronic computing device, possibly used together with a device that receives, transmits, electronically filters or otherwise electromagnetically manipulates or transforms signals. The computer system or other similar electronic computing device manipulates and/or transforms information represented as electronic or similar quantities within the computer system's registers and memories into other information that is similarly represented as electronic or other quantities within the computer system registers, memories, information storage, display and transmission devices. The present invention is also suitable for use with other computer systems, such as optical, mechanical and biological computers.

In a generalized embodiment, the system disclosed here includes one or more optional "menus" that are simultaneously or serially consulted to monitor vehicle use. A first menu sets forth the class of biometric indicium or indicia presented for identification of the person. This first menu includes one or more of:

fingerprint;
thumbprint;
handprint;
hand silhouette;
cursive signature;
facial image;
iris scan;
retinal scan;
voiceprint;
blood vein pattern scan;
blood sample analysis; and any other biometric indicium that can reasonably be presented and analyzed.

A second menu sets forth one or more classes, if any, of ROs to which the driver (who has presented a biometric indicium) belongs, including:

very young drivers;

very old drivers;

physically or mentally impaired drivers;

drivers with restricted driving licenses (for example, DUI-convicted drivers);

transporters of hazardous substances; and any other reasonable classes of RO drivers.

A third menu sets forth the classes of limitations to be imposed on the driver, including:

restriction to a selected geographic region;

restriction to one or more specified routes (e.g., to allow a DUI driver to commute to and from work);

restriction to a selected maximum accumulated mileage within a 24-hour period;

restriction to a selected maximum accumulated time of operation within a 24-hour period;

restriction to a selected maximum speed;

restriction of vehicle operation to one or more selected time intervals during the day, or to selected days during the week; and similar reasonable restrictions on vehicle operation.

A fourth menu sets forth the classes of penalties or externally imposed restrictions, if any, to be imposed if the vehicle driver is found to be operating outside the permissible vehicle operating range(s), including:

halting the vehicle immediately or within a short time interval;

fuel cutoff;

disabling the air brakes on a truck or bus;

disabling use of selected vehicle accessories;

reducing the vehicle speed to a maximum selected speed using a speed "governor";

limiting the vehicle accumulated mileage or accumulated operation time to a selected range;

forcing the vehicle to operate in selected lower gears;

turning the vehicle lights or external flashers or horn on continuously or periodically;

activating an on-board alarm that is audibly or visually perceptible alarm to someone outside the vehicle;

activating an air bag on the driver's side of the vehicle;

transmitting a silent alarm to a central vehicle monitoring facility;

disallowing operation of the vehicle by the offending driver within a selected geographic region for a specified time interval;

presenting a visually perceptible and/or audibly perceptible warning that the vehicle is operating, or will soon operate, outside one or more permissible operating ranges;

logging the violation and offending driver, with no immediate penalty imposed; and any other reasonable penalty.

Systems for obtaining and analyzing one or more biometric indicia are disclosed in the printed literature and on the Internet. FaceIt 3.0 from Visionics (URL http:///www.faceit.com) uses video images to analyze and recognize facial geometry. Wired Magazine, February 1998, page 7, reports a facial recognition system developed by Roman Kuc of Yale University that uses three spaced apart sonic beams to analyze and recognize a facial image, and many other images with fine detail. Hand geometry recognition is provided by Personal I.D., offered by Recognition Systems (URL http:///www.recogsys.com/pid.html). American Biometric Company (URL http:///www.abio.com/body_index.html) offers the BioMouse Desktop Fingerprint Scanner. The VeriVoice product by VeriVoice (URL http:///www.verivoice.com/product.html) provides a voice analysis and recognition system. Shurlock Security Systems (URL http:///www.fia.net/shurlock/features.html) offers Touch & Go, which enables and disables a vehicle engine system, based on entry of any one of twenty 64-bit engine security keys. The EU Veincheck project, which interrogates the body locally to determine a blood vein pattern for use in personal identification and access control, is discussed in Biometric Technology Today, September 1996, pages 1–2.

U.S. Pat. No. 4,817,432, issued to Wallace et al, discloses an ultrasonic scanner for measuring the corneal thickness and axial length of a human eye that is presented to the system. U.S. Pat. Nos. 5,222,152 and 5,230,025, issued to Fishbine et al, disclose portable fingerprint scanning apparatus that optically scans, records and transmits fingerprint images over a wireless channel to a mobile unit for analysis and verification. U.S. Pat. No. 5,229,764, issued to Matchett et al, discloses a biometric authentication matrix that simultaneously identifies one or more biometric indicia, including thumbscan, digital photo, voiceprint and fingerprint(s). U.S. Pat. Nos. 5,259,025 and 5,268,963, issued to Monroe et al, disclose use of a card including facial representation, fingerprint, cursive signature, voice print and retinal eye scan for personal identification. U.S. Pat. No. 5,280,527, issued to Gullman et al, discloses provision of a biometric system that receives and analyzes a token having a time varying code and including biometric information on a person's voiceprint, cursive signature, fingerprint and similar indicia. U.S. Pat. No. 5,291,560, issued to Daugman, discloses an iris scanner for an eye that provides an "optical fingerprint." U.S. Pat. Nos. 5,335,288 and 5,483,601, issued to Faulkner et al, disclose a system that receives and analyzes a silhouette of a person's hand, plus a scanned portion of the hand, for personal identification. U.S. Pat. No. 5,563,453, issued to Gagne et al, discloses a fingerprint identifier that uses a 24-byte code for storing this information. U.S. Pat. No. 5,469,506, issued to Berson et al, discloses provision of an identification card including biometric information, such as a fingerprint or a cursive signature on the alleged holder of the card; the holder's own biometric characteristics are scanned in and compared with the information contained on the card. U.S. Pat. No. 5,534,855, issued to Shockley et al, discloses a system that receives and analyzes biometric indicia to determine which tasks a person is authorized to perform. U.S. Pat. No. 5,579,909, issued to Deal, discloses use of a thumbprint scanning and recognition system to allow access to a locked box that may contain one or more dangerous instruments, such as firearms or other weapons. U.S. Pat. No. 5,586,171, issued to McAllister et al, discloses use of a voice recognition system that responds to and analyzes video data presented in response to prompting of a person. U.S. Pat. No. 5,594,806, issued to Colbert, analyzes the contour of knuckles of a hand that is presented for personal identification. U.S. Pat. No. 5,638,832, issued to Singer et al, discloses provision of a small liquid crystal visual display, implanted just beneath the epidermis in the human skin, to provide a readable display for continuous biosensor information or for human "tagging." The information in these articles and patents is incorporated by reference herein.

Although this invention has been discussed primarily in the context of restrictions on use of a land vehicle, such as an automobile, a truck or a bus, the invention has application to a waterborne vehicle, such as a boat, and has application to an airborne vehicle, such as an aircraft, if changes are made in the Control Actions menu. For example, it probably would not be appropriate to include the penalties of fuel cutoff, restriction of operation of the vehicle to lower gears, or activation of an airbag for waterborne or airborne vehicles.

I claim:

1. A method for restricting use of a vehicle, the method comprising the steps of:

providing a permitted range of location coordinates, corresponding to one or more permitted vehicle travel regions, and a permitted time interval, corresponding to at least one permitted region, within which a selected vehicle may travel;

for at least one selected time during which the vehicle is in motion, determining the present time and determining if the present time is within at least one permitted time interval;

when the present time is not within at least one permitted time interval, taking at least one Control Action to control use of the vehicle;

when said present time is within a permitted time interval, providing a permitted range of location coordinates, corresponding to one or more permitted vehicle travel regions, determining the vehicle present location coordinates, and determining if the vehicle present location coordinates lie within a permitted travel region corresponding to said permitted time interval;

said step of determining said vehicle present location coordinates comprises the steps of:

attempting to receive location determination (LD) signals from one or more selected LD signal sources;

determining if sufficient LD signals are being received to determine said vehicle present location coordinates;

when sufficient LD signals are being received, determining said vehicle present location coordinates; and when sufficient LD signals are being received, taking at least one action drawn from the class of Control Actions consisting of: (1) disabling said vehicle at a selected time so that said vehicle no longer operates for at least a selected time interval; (2) disabling operability of one or more selected accessories for said vehicle; (3) reducing the speed of said vehicle to a selected speed range; (4) allowing said vehicle to operate only in one or more selected vehicle transmission gears; (5) turning on at least one of lights, exterior flashers and vehicle horn for at least one selected time interval; (6) activating an alarm that is visually perceptible or audibly perceptible by a person located outside of and adjacent to said vehicle; (7) transmitting a selected alarm signal to a selected facility that is spaced apart from said vehicle; (8) activating at least one air bag on said vehicle; (9) allowing said vehicle to operate for at most a selected cumulative time interval; (10) allowing said vehicle to operate only within one or more selected time intervals; (11) allowing said vehicle to operate for at most a selected cumulative vehicle mileage; and (12) recording information that describes present activity of said vehicle; and when the present time is within said permitted time interval and the vehicle present location coordinates do not lie within the permitted travel region, taking at least one Control Action to control use of said vehicle.

2. The method of claim 1, further comprising the step of choosing said at least one action to control use of said vehicle from the class of Control Actions consisting of: (1) disabling said vehicle at a selected time so that said vehicle no longer operates for at least a selected time interval; (2) disabling operability of one or more selected accessories for said vehicle; (3) reducing the speed of said vehicle to a selected speed range; (4) allowing said vehicle to operate only in one or more selected vehicle transmission gears; (5) turning on at least one of lights, exterior flashers and vehicle horn for at least one selected time interval; (6) activating an alarm that is visually perceptible or audibly perceptible by a person located outside of and adjacent to said vehicle; (7) transmitting a selected alarm signal to a selected facility that is spaced apart from said vehicle; (8) activating at least one air bag on said vehicle; (9) allowing said vehicle to operate for at most a selected cumulative time interval; (10) allowing said vehicle to operate only within one or more selected time intervals; (11) allowing said vehicle to operate for at most a selected cumulative vehicle mileage; and (12) recording information that describes present activity of said vehicle.

3. The method of claim 1, further comprising the step of:

when said present time is within said permitted time interval and said vehicle present location coordinates lie within said permitted travel region, allowing said vehicle to continue to move for at least a selected time interval.

4. The method of claim 1, further comprising the step of modifying at lest one of said permitted time intervals.

5. The method of claim 4, further comprising the step of modifying said location coordinates contained in at least one of said permitted time ranges.

6. The method of claim 1, further comprising the step of modifying at least one of said permitted time intervals.

7. The method of claim 6, wherein said step of modifying said permitted range of time comprises transmitting a change signal to said vehicle that modifies said permitted time interval.

8. The method of claim 1, further comprising the step of modifying said location coordinates contained in at least one of said permitted time ranges.

9. The method of claim 8, wherein said step of modifying said range of location coordinates for said permitted time range comprises transmitting a change signal to said vehicle that modifies said location coordinates contained in said permitted time range.

10. The method of claim 1, further comprising the steps of:

providing at least one permitted speed range for said vehicle;

when said vehicle is in motion, determining the present speed of said vehicle;

when the present vehicle speed is not within a permitted speed range, taking at least one Control Action to control use of said vehicle.

11. The method of claim 10, further comprising the step of modifying said permitted speed range for said vehicle.

12. The method of claim 11, wherein said step of modifying said permitted speed range for said vehicle comprises transmitting a change signal from a monitoring station to said vehicle that modifies said permitted speed range.

13. The method of claim 1, further comprising the steps of:

providing a permitted accumulated mileage range for operation of said vehicle within said permitted time interval;

determining the present accumulated mileage range of said vehicle within said permitted time interval; and when the present accumulated mileage range is not within the permitted accumulated mileage range, taking at least one action drawn from the class of said Control Actions.

14. The method of claim 13, further comprising the step of modifying said permitted accumulated mileage range for said vehicle.

15. The method of claim 14, wherein said step of modifying said permitted accumulated mileage range for said vehicle comprises transmitting a change signal to said vehicle that modifies said permitted accumulated mileage range.

16. The method of claim 1, further comprising the steps of:

providing a permitted accumulated vehicle operation time for said vehicle within said permitted time interval;

determining the present accumulated vehicle operation time for said vehicle within said permitted time interval; and when the present accumulated vehicle operation time is greater than the permitted accumulated vehicle operation time, taking at least one action Control Action to control use of said vehicle.

17. The method of claim 16, further comprising the step of modifying said permitted accumulated vehicle operation time for said vehicle.

18. The method of claim 17, wherein said step of modifying said permitted accumulated vehicle operation time for said vehicle comprises transmitting a change signal to said vehicle that modifies said permitted accumulated vehicle operation time.

19. The method of claim 1, further comprising the steps of:

requiring a driver of said vehicle to present a token before the driver can operate said vehicle, where the token contains information that allows determination of at least one of (1) identity of the presenter of the token, (2) a permitted time interval and (3) a permitted travel region in which said vehicle can operate; and reading the information contained on the token.

20. A method for restricting use of a vehicle by a vehicle operator, the method comprising the steps of:

for at least one selected time during which an operator operates a selected vehicle, requesting the operator to provide a selected ident indicium, within a selected indicium time interval, for interrogation; and when the operator does not provide the requested ident indicium within the selected indicium time interval, or when the operator provides the requested ident indicium and (i) the ident indicium cannot be interrogated or (ii) the ident indicium is interrogated but the operator cannot be identified by the indicium or (iii) the ident indicium is interrogated and the operator is identified as a restricted operator for whom operation of the vehicle is restricted in some manner, taking at least one Control Action to control use of the vehicle;

choosing said at least one action to control use of said vehicle from the class of Control Actions consisting of:

(1) disabling said vehicle at a selected time so that said vehicle no longer operates for at least a selected time interval; (2) disabling operability of one or more selected accessories for said vehicle; (3) reducing the speed of said vehicle to a selected speed range; (4) allowing said vehicle to operate only in one or more selected vehicle transmission gears; (5) turning on at least one of lights, exterior flashers and vehicle horn for at least one selected time interval; (6) activating an alarm that is visually perceptible or audibly perceptible by a person located outside of and adjacent to said vehicle; (7) transmitting a selected alarm signal to a selected facility that is spaced apart from said vehicle; (8) activating at least one air bag on said vehicle; (9) allowing said vehicle to operate for at most a selected cumulative time interval; (10) allowing said vehicle to operate only within one or more selected time intervals; (11) allowing said vehicle to operate for at most a selected cumulative vehicle mileage; and (12) recording information that describes present activity of said vehicle;

said step of allowing a restricted operator to operate the vehicle only within a selected geographic region and only within one or more selected operation time intervals comprises the steps of:

providing a permitted range of location coordinates, corresponding to said permitted region, and a permitted time interval, corresponding to said permitted region, within which said vehicle may travel when operated by the restricted operator;

when the restricted operator is determined to be operating the vehicle, determining the present time and determining if the present time is within at least one permitted time interval;

when the present time is not within at least one permitted time interval, taking at least one action drawn from the class of said Control Actions;

when said present time is within a permitted time interval, determining the vehicle present location coordinates, and determining if the vehicle present location coordinates lie within a permitted range of location coordinates corresponding to said permitted time interval;

when the present time is within said permitted time interval and the vehicle present location coordinates do not lie within the permitted range, taking at least one action drawn from the class of said Control Actions;

when said present time is within said permitted time interval and said vehicle present location coordinates lie within said permitted range, allowing said restricted operator to operate said vehicle for at least a selected time interval;

modifying a permitted range of time for at least one of said permitted time intervals;

modifying said location coordinates contained in at least one of said permitted time ranges;

said step of determining said vehicle present location coordinates comprises the steps of:

attempting to receive location determination (LD) signals from one or more selected LD signal sources;

determining if sufficient LD signals are being received to determine said vehicle present location coordinates;

when sufficient LD signals are being received, determining said vehicle present location coordinates; and when sufficient LD signals are being received, taking at least one action drawn from the class of Control Actions consisting of, (1) disabling said vehicle at a selected time so that said vehicle no longer operates for at least a selected time interval; (2) disabling operability of one or more selected accessories for said vehicle; (3) reducing the speed of said vehicle to a selected speed range; (4) allowing said vehicle to operate only in one or more selected vehicle transmission gears; (5) turning on at least one of lights, exterior flashers and vehicle horn for at least one selected time interval; (6) activating an alarm that is visually perceptible or audibly perceptible by a person located outside of and adjacent to said vehicle; (7) transmitting a selected alarm signal to a selected facility that is spaced apart from said vehicle; (8) activating at least one air bag on said vehicle; (9) allowing said vehicle to operate for at most a selected cumulative time interval; (10) allowing said vehicle to operate only within one or more selected time intervals; (11) allowing said vehicle to operate for at most a selected cumulative vehicle mileage; and (12) recording information that describes present activity of said vehicle.

21. The method of claim 20, further comprising the step of:
when said present time is within said permitted time interval and said vehicle present location coordinates lie within said permitted range, allowing said restricted operator to operate said vehicle for at least a selected time interval.

22. The method of claim 21, further comprising the step of modifying a permitted range of time for at least one of said permitted time intervals.

23. The method of claim 22, further comprising the step of modifying said location coordinates contained in at least one of said permitted time ranges.

24. The method of claim 20, further comprising the step of modifying a permitted range of time for at least one of said permitted time intervals.

25. The method of claim 24, wherein said step of modifying said permitted range of time comprises transmitting a change signal to said vehicle that modifies said permitted time interval.

26. The method of claim 20, further comprising the step of modifying said location coordinates contained in at least one of said permitted time ranges.

27. The method of claim 26, wherein said step of modifying said range of location coordinates for said permitted time rang e comprises transmitting a change signal to said vehicle that modifies said location coordinates contained in said permitted time range.

28. The method of claim 20, further comprising the steps of:
providing a permitted velocity range for said vehicle;
when the restricted operator is determined to be operating said vehicle, determining the present velocity of said vehicle;
when the present vehicle velocity is not within a permitted speed range, taking at least one action drawn from the class of said Control Actions.

29. The method of claim 28, further comprising the step of modifying said permitted speed range for said vehicle.

30. The method of claim 29, wherein said step of modifying said permitted speed range for said vehicle comprises transmitting a change signal from a monitoring station to said vehicle that modifies said permitted speed range.

31. The method of claim 20, further comprising the steps of:
providing a permitted accumulated mileage range for operation of said vehicle within said permitted time interval;
when said restricted operator is determined to be operating said vehicle determining the present accumulated mileage range of said vehicle within said permitted time interval;
when the present accumulated mileage range is not within the permitted accumulated mileage range, taking at least one action drawn from the class of said Control Actions.

32. The method of claim 31, further comprising the step of modifying said permitted accumulated mileage range for said vehicle.

33. The method of claim 32, wherein said step of modifying said permitted accumulated mileage range for said vehicle comprises transmitting a change signal to said vehicle that modifies said permitted accumulated mileage range.

34. The method of claim 20, further comprising the steps of:
providing a permitted accumulated vehicle operation time for said vehicle within said permitted time interval;
determining the present accumulated vehicle operation time for said vehicle within said permitted time interval;
when the present accumulated vehicle operation time is greater than the permitted accumulated vehicle operation time, taking at least one action drawn from the class of said Control Actions.

35. The method of claim 34, further comprising the step of modifying said permitted accumulated vehicle operation time for said vehicle.

36. The method of claim 35, wherein said step of modifying said permitted accumulated vehicle operation time for said vehicle comprises transmitting a change signal to said vehicle that modifies said permitted accumulated vehicle operation time.

37. The method of claim 20, further comprising the step of selecting said ident indicium from the class of biometric indicia consisting of a thumbprint, a fingerprint, a handprint, a hand silhouette, a partial facial scan, a full facial scan, a retinal scan, an iris scan, a voice sample analysis, a blood vein pattern scan and a blood sample analysis.

38. The method of claim 20, further comprising the steps of:
requiring a driver of said vehicle to present a token before the driver can operate said vehicle, where the token contains information that allows determination of at least one of a permitted time interval, a permitted travel region in which said vehicle can operate, and said selected biometric indicium; and
reading the information contained on the token and determining at least one of a permitted time interval, a permitted region in which said vehicle can operate, a permitted speed range within which said vehicle can operate, and said biometric indicium.

39. The method of claim 20, further comprising the steps of:
requiring a driver of said vehicle to enter personal information into a selected computer before the driver can operate said vehicle, where the personal information allows identification of the driver; and
reading the personal information entered and determining at least one of a permitted time interval, a permitted region in which said vehicle can operate, and a permitted speed range within which said vehicle can operate.

\* \* \* \* \*